W. L. BLACK.
VEHICLE SPINDLE.
APPLICATION FILED APR. 7, 1914.
1,140,792.
Patented May 25, 1915.
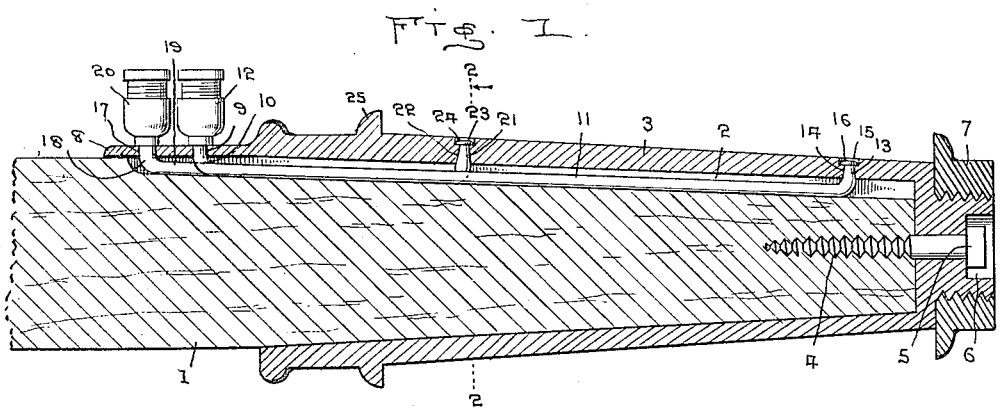
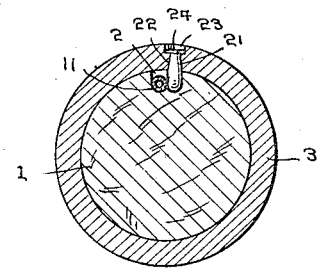
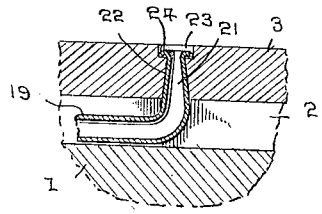

UNITED STATES PATENT OFFICE.

WALTER L. BLACK, OF ALLEN, NEBRASKA.

VEHICLE-SPINDLE.

1,140,792.   Specification of Letters Patent.   Patented May 25, 1915.

Application filed April 7, 1914. Serial No. 830,175.

*To all whom it may concern:*

Be it known that I, WALTER L. BLACK, a citizen of the United States, residing at Allen, in the county of Dixon and State of Nebraska, have invented certain new and useful Improvements in Vehicle-Spindles; and I do hereby declare the following to be a full, clear, and exact description of the invention, such as will enable others skilled in the art to which it appertains to make and use the same.

This invention relates to vehicle spindles and more particularly to the automatic lubricating type of spindles, and has for one of its objects the provision of means for supplying the lubricant to the spindle or skein at the points of greatest wear.

A further object of this invention is the provision of means for independently lubricating the end of the spindle or skein, whereby either or both of the ends at the points of greatest wear may be lubricated as desired.

A still further object of this invention resides in the construction of a thimble skein or spindle which may be readily applied to any of the well known axle constructions now in use with but a slight change in the axle construction. And a still further object of this invention resides in the construction of an automatic lubricating skein or spindle for vehicles, which is simple in construction, efficient and durable in purpose and which can be manufactured at a nominal cost.

These and other objects will more fully appear and the nature of the invention more clearly understood by the construction, combination and arrangements of the parts thereof, as described in the following specification, defined in the appended claims and illustrated in the accompanying drawings, in which, Figure 1 is a vertical longitudinal sectional view of my invention showing the construction of the assembled parts and the manner in which the same is applied to the usual axle of a vehicle. Fig. 2 is a vertical transverse sectional view taken on line 2—2 of Fig. 1 looking in the direction of the arrows, showing the manner in which the lubricating pipes of the skein are seated in the groove formed within the axle, and, Fig. 3 is a fragmentary sectional detailed view of one of the restricted nozzles of one of the lubricating pipes showing the manner in which the nozzle is crimped within the recess formed in the upper part of the skein.

I deem it advisable to here state that for the sake of convenience and illustration, I have here shown my invention as applied to the thimble skein of a wagon, but it is to be clearly understood that I do not restrict my invention to this particular use, as the same is equally adapted for use in connection with buggy or other vehicle spindles of the iron axle type, the only difference being, in the latter case, that in place of the groove formed in the wooden axle of a wagon, the spindle of the iron axle may be formed with a bore in place of the groove.

Referring to the drawings 1 denotes the axle having formed in the upper surface thereof the elongated groove or channel 2, which groove or channel 2 may be formed upon the top of the axle, the bottom or at either side as preferred and arranged upon the axle 1 and embracing the channel way 2 is a thimble skein 3 retained upon the axle 1 through the medium of the screw bolt 4, the head 5 of which is seated in the recess 6 formed in the outer end of the skein 3, the skein 3 being also provided with the nut or tap 7 for retaining the wheel upon the skein. The skein 3 has formed at the inner upper portion thereof the cover plate 8, the skein 3 with its cover plate 8 entirely inclosing the groove or channel 2 of the axle 1, the cover plate 8 being provided with the aperture 9 through which projects the upwardly curved portion 10 of the lubricating pipe 11, and upon the projecting end 10 is arranged the lubricating cup 12 for holding any suitable lubricant being preferably hard oil. The pipe 11 is designed to lie within the groove or channel 2 of the axle 1 at one side thereof and has arranged upon its outer end the upwardly extending restricted nozzle 13 projecting upwardly through the converging aperture 14 terminating in the recess 15 formed in the skein 3, the protruding end of the restricted nozzle 13 being crimped as shown at 16 within the recess 15, the upper edge of the crimped portion 16 lying in a plane below the outer surface of the skein 3 thus forming an auxiliary reservoir adjacent the outer end of the skein 3 for supplying the lubricant thereto. The function of the restricted nozzle is to control the flow of the lubricant in the pipes and prevent a too rapid flow through the pipes.

Arranged within the cover plate 8 of the skein 3 slightly to one side and rearwardly of the aperture 9 is the aperture 17 through which projects the up-turned portion 18 of the lubricating pipe 19, and upon the protruding end of the portion 18 is arranged the lubricating cup 20 similar in construction to the lubricating cup 12 of the pipe 11. The pipe 19 being seated within the groove or channel 2 of the axle 1 at one side thereof and lying in the same plane and in close contact with the pipe 11, the pipe 19, however, being of shorter length than the pipe 11, and being provided at its outer end with the upturned restricted nozzle 21 projecting through the converging aperture 22 terminating in the recess 23 formed in the skein 3 adjacent the shoulder 25 thereof, the protruding end of the nozzle 21 of the pipe 19 being also crimped as at 24, the upper surface of the crimping portion 24 lying in a plane below the upper surface of the skein 3, thus providing an auxiliary reservoir adjacent the shoulder portion 25 of the skein 3.

It is to be here noted that I have provided an automatic lubricating skein or spindle for vehicles, wherein the lubricant may be supplied to the portion adjacent the end of the skein or spindle, or to the portion adjacent the shoulder 25 thereof independently of each other, if so desired, or the lubricant may be simultaneously supplied to both ends of the skein or spindle if desired. The lubricating cups 12 and 20 are to be supplied with any suitable lubricant, preferably hard oil, the lubricant being conveyed by the respective pipes 11 and 19 to the nozzles 13 and 21, the lubricant from the nozzles 13 and 21 fill the auxiliary reservoirs 15 and 23 respectively to a point of a slight overflow, but at the same time there remains in the reservoirs 15 and 23 sufficient lubricant to constantly supply these points of greatest wear with the hard oil or other fluid.

I have here shown and described the preferred embodiment of my invention, but I hereby reserve the right to make such variations and alterations therein from time to time as I may deem expedient and which will not depart from the spirit of the invention nor conflict with the scope of the claims.

Having thus fully described my invention what I claim as new, and desire to secure by Letters Patent of the United States is:—

1. A lubricating spindle for vehicles, in combination with an axle, a spindle thereon, said axle and said spindle having coöperating channels, pipes within said channels for independently conveying a lubricant to each of the respective ends of said spindle, one of said pipes being of less length than the other of said pipes, a lubricating cup for each of the said pipes and a restricted nozzle on the end of each of said pipes, whereby the flow of the lubricant is retarded and controlled in the said pipes.

2. A lubricating spindle for vehicles, in combination with an axle, a spindle thereon, said axle and said spindle having coöperating channels, pipes within said channels for independently conveying a lubricant to each of the respective ends of said spindle, one of said pipes being of less length than the other of said pipes, a lubricating cup for each of said pipes, a restricted nozzle on the end of each of said pipes and a recess formed in the surface of the spindle at the end of each pipe.

In testimony whereof I have signed my name to this specification in the presence of two subscribing witnesses.

WALTER L. BLACK.

Witnesses:
W. F. FILLEY,
S. K. WHORTON.

Copies of this patent may be obtained for five cents each, by addressing the "Commissioner of Patents, Washington, D. C."